March 27, 1962 G. M. ROSENBERRY, JR 3,027,474
SQUIRREL CAGE INDUCTION MOTOR ROTOR
Filed Sept. 4, 1956
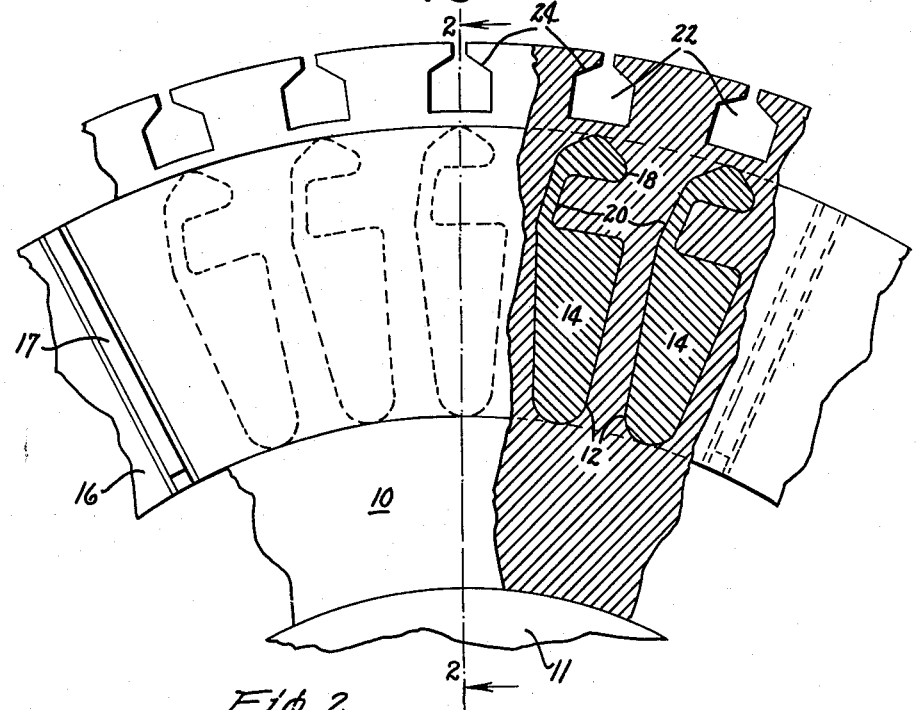
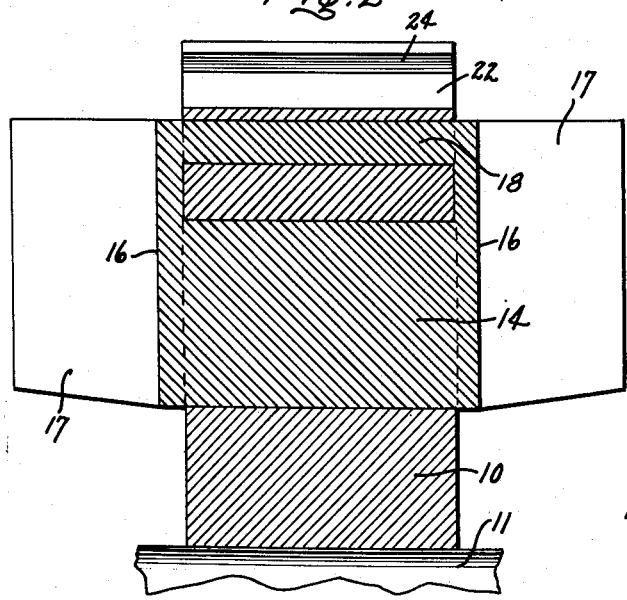
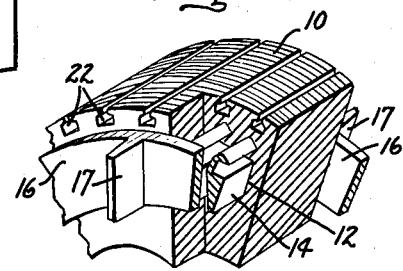
Inventor:
George M. Rosenberry, Jr.,
by Vernon F. Kalb
His Attorney United States Patent Office 3,027,474
Patented Mar. 27, 1962

3,027,474
SQUIRREL CAGE INDUCTION MOTOR ROTOR
George M. Rosenberry, Jr., Schenectady, N.Y., assignor to General Electric Company, a corporation of New York
Filed Sept. 4, 1956, Ser. No. 607,731
1 Claim. (Cl. 310—211)

The invention described herein relates to dynamoelectric machines and more particularly to an improved squirrel cage induction motor rotor and has for its object the provision of a high reactance slot in the rotor for obtaining improved operating characteristics for the machine.

Induction motors of the single squirrel cage type are of relatively simple construction and convert electrical power into mechanical power by merely coupling the rotor to a load, connecting the motor leads to a power supply of the proper phase and closing a switch. The rotor rapidly comes up to speed and rotates at substantially constant speed over a wide range of loads. There are two principal shortcomings in this type motor however, since (1) excessively high starting currents are required to ensure good starting torque and adequate running efficiency, and (2) the motor will not run efficiently because the power represented by the slip times the output torque is dissipated in rotor heating.

In order to overcome these principal disadvantages, manufacturers have resorted to making many different types or modifications of rotors, such as the deep-bar and double squirrel cage rotors for example, which incorporate features desirable for most services. Each of these specially designed motors are specifically employed to satisfy the requirements of a purchaser or user of the machine, which may consist of any one or a combination of low starting current, high starting torque, frequent starting and stopping or reduced speed operation. These various types of machines principally attempt to limit the starting current while simultaneously obtaining high starting torques, although other design features may be incorporated in the machines according to the requirements of a particular application.

In the deep-bar type of squirrel cage rotor, the bar is generally of narrow construction and placed deep in a slot so that upon starting, current flows through the bar at substantially full line frequency and crowds outwardly in the bar from the center of the rotor so that the effect is one of increasing the effective resistance. When the rotor is running at full speed however, the slip frequency is low and the current becomes uniformly distributed throughout the bar thereby encountering lesser resistance. Thus, the increase in starting resistance is obtained by the presence of a reactive voltage that forces the current into a higher resistance path when the frequency is high. When the motor speeds up and the frequency decreases, the voltage declines and the current assumes its normal path of resistance and higher inductance. In some cases, an objection is encountered to this type rotor since the ratio of bar depth to width is so large that additional space must be provided which results in a corresponding weakness in the structure. Further, only a limited amount of starting reactance can be obtained with this slot.

The double squirrel cage rotor is well known and generally comprises a plurality of slots arranged in concentric rings, each having spaced bars positioned radially in the rotor in which the bottom or inner bar is of low resistance while the upper or outer bar is of much higher resistance. Connection between the two bars is made by a narrow leakage slot and the arrangement is such that reasonably good resistance-reactance ratios are obtained. However, several compromises in design must be made, such as making the leakage slot of a width necessary for avoiding saturation when the bottom bar current is of a maximum, or otherwise the reactance will be reduced at starting when it is needed, but will be present at speeds where it is not wanted. Also, high resistance values in the top bar, which are necessary for high starting reactance, leads to heating difficulties when the rotor is stalled and conductor casting problems are also encountered. A low resistance top bar produces high starting currents although high torque is not obtained until the middle-speed range is reached. Starting reactance can be made higher than that obtainable in a deep bar but it is still less than desired in some cases. The higher reactances are particularly needed where high efficiencies are desired so that the flux can be raised to lower stator and rotor $I^2R$ losses and load loss. Large totally enclosed fan cooled machines are an example of a type where a double squirrel cage rotor is desirable.

In carrying out my invention, I provide a squirrel cage induction motor rotor having the desired characteristics by specifically designing the rotor to have a higher reactance at starting thereby making possible minimum starting currents heretofore impossible of attainment in prior art machines. In its broadest aspect, the invention provides a cast rotor having slots disposed in a pair of concentric circular planes wherein the slots in each plane are spaced and preferably positioned in radial alignment with one another. The inner slot nearest the rotor shaft is designed to receive cast conductors while the outer slot is kept open and free of conductive material. The arrangement of slots is such that current is permitted to flow only in the inner slots during all conditions of machine operation while the outer slot provides reactance for limiting the starting current for the machine.

While the specification concludes with claims particularly pointing out and distinctly claiming the subject matter which I regard as my invention, it is believed the invention will be better understood from the following description taken in connection with the accompanying drawing in which:

FIGURE 1 is a view in elevation, partly in section, showing a cast winding rotor for a squirrel cage induction motor;

FIGURE 2 is a view on lines 2—2 of FIGURE 1; and

FIGURE 3 is a perspective view, partly in section, showing the arrangement of parts in the rotor.

Referring now to the drawings wherein like reference characters designate like or corresponding parts throughout the several views, there is shown in FIGURES 1 and 2 an end view of a rotor 10 made either by a casting operation or by utilizing preformed bar conductors in a plurality of laminations which are secured together to form the rotor core, as in the usual construction. The rotor is supported on a shaft 11 and provided with a plurality of winding or inner slots 12 filled with conducting material such as copper, brass or aluminum bars 14 which are preformed or cast in position. Each bar is electrically connected to and short-circuited in end rings 16 rigidly affixed on each end of the rotor. Fan blades 17 are utilized for cooling the rotor in a well known manner.

The inner slot consists of a relatively large section for receiving the main body of conducting bars 14 and is connected to a much smaller section 18 by a reduced portion or neck 20. The slots 12 shown are of the double squirrel cage type although slots of different size or configuration may be used, such as rectangular, inverted key-hole, conical and the like. This type of slot serves the same function as the deep-bar slot previously discussed and the purpose of the high resistance section 18 and neck 20 is to limit the flow of current in this area during starting, thereby supplying a greater amount of current through the main portion of bars 14. As the rotor is brought up to speed, there is a gradual redistribution of the current in the conductive bars 14 until at full speed, it appears uniformly throughout the bars 14 in the lower section of the slot.

As previously stated, the new concept disclosed herein is to provide a machine having a higher reactance at starting and low reactance when running at normal speed, while simultaneously achieving greater operating efficiency than known machines expressly designed to include the same characteristics. These advantageous features are obtained by providing in the outer peripheral surface of the rotor, a plurality of open or conductor-free reactance slots 22 extending axially of bars 14 and generally being of rectangular shape throughout the length, although slots having other configurations may be used, so long as the slots are free of conductive material. As shown, the outermost end of each slot is provided with a shoulder 24 partially closing the slot so as to keep core and load losses to a minimum. The wide rectangular portion of the slot is made wide enough to prevent perceptible flux saturation in slot 22 during starting and running while the shoulders tend to increase the area of magnetic material presented to the air gap, thereby providing a high power factor although the running losses are normal when the machine is operating under normal conditions. It is to be noted that the reactance slot need not be open as illustrated, but may be completely closed and still obtain the desired operating characteristics. Also, the slot 22 may be omitted from one or more of the punchings positioned on opposite ends of the rotor so as to prevent flow of conductor material into slot 22 when the conductors are being cast in slots 12.

By utilizing the particular shape of slot described above, the saturation of the added reactance during full voltage starting is eliminated. Thus, this component of reactance does not increase under other conditions to cause lowered torque and lowered power factor. Further, it has been found that the higher fluxes possible with this design result in lower stator and rotor I²R losses and load losses. The open slots also in addition to providing increased reactance may be used to carry cooling air into machines using axial ventilation or into machines using stator ventilation ducts only.

In view of the above, it will be evident to those skilled in the art that many modifications and variations are possible in light of the above teachings. The principal concept disclosed herein is that of providing conducting bars in a ring of slots located radially of the rotor shaft. These slots may be of any design or configuration compatible with obtaining good operating characteristics for the machine. The outer slots are free of conductors and serve to increase the reactance of the machine and these latter slots may be either open or closed to the rotor peripheral surface, and equipped with or without a shoulder, in order to secure the additional reactance at starting, but will provide a minimum amount when the machine is operating at low slip frequencies. It therefore is to be understood that within the scope of the appended claim, the invention may be practiced otherwise than as specifically described.

What I claim as new and desire to secure by Letters Patent of the United States is:

A rotor for an induction motor comprising a cylindrical core member supported for rotation on a shaft centrally positioned therein, a plurality of conductor slots spaced in a circular plane between said shaft and the outer peripheral surface of said member and arranged to extend the length thereof, a conductor of the type having radially aligned interconnected inner and outer portions in each of said slots terminating in end rings attached to each end of the member for respectively forming the running and starting windings for said rotor, and a plurality of independent reactance slots extending the length of said member and located in alignment between said conductor inner and outer portions and said outer surface, said reactance slots having walls forming a void area with entrance into said void area being from the peripheral surface of said member, said reactance slots being of rectangular configuration and provided with a pair of inwardly directed shoulders terminated in said entrance positioned in said peripheral surface.

References Cited in the file of this patent

UNITED STATES PATENTS

| | | |
|---|---|---|
| 2,067,605 | Griffin | Jan. 12, 1937 |
| 2,175,915 | Potter | Oct. 10, 1939 |
| 2,758,228 | Dunn et al. | Aug. 7, 1956 |
| 2,794,138 | Dunn | May 28, 1957 |

FOREIGN PATENTS

| | | |
|---|---|---|
| 165,946 | Switzerland | Feb. 16, 1934 |
| 183,845 | Great Britain | Aug. 23, 1923 |
| 493,523 | Great Britain | Oct. 10, 1938 |
| 532,560 | Great Britain | Jan. 27, 1941 |
| 624,366 | Germany | Jan. 18, 1936 |
| 662,946 | Germany | July 25, 1938 |
| 665,147 | Germany | Sept. 17, 1938 |